(12) United States Patent
Knight et al.

(10) Patent No.: US 8,744,616 B2
(45) Date of Patent: Jun. 3, 2014

(54) STORAGE TRAY POPULATOR AND METHOD FOR POPULATING A STORAGE TRAY WITH A PLURALITY OF BIOLOGICAL SAMPLE CONTAINERS

(75) Inventors: Charles R Knight, Ankeny, IA (US); Gang Wan, Grimes, IA (US); Jeffrey D Wille, Johnston, IA (US)

(73) Assignee: Pioneer Hi Bred International Inc, Johnston, IA (US)

( * ) Notice: Subject to any disclaimer, the term of this patent is extended or adjusted under 35 U.S.C. 154(b) by 39 days.

(21) Appl. No.: 13/454,514

(22) Filed: Apr. 24, 2012

(65) Prior Publication Data

US 2012/0282075 A1 Nov. 8, 2012

Related U.S. Application Data

(60) Provisional application No. 61/483,284, filed on May 6, 2011.

(51) Int. Cl.
*G06F 7/00* (2006.01)

(52) U.S. Cl.
USPC .......... 700/218; 700/216; 700/224; 700/225; 700/226; 700/231; 414/800

(58) Field of Classification Search
None
See application file for complete search history.

(56) References Cited

U.S. PATENT DOCUMENTS

| | | | | |
|---|---|---|---|---|
| RE37,829 E | * | 9/2002 | Charhut et al. | 700/216 |
| 6,544,799 B1 | * | 4/2003 | Lewis et al. | 436/180 |
| 2011/0147610 A1 | * | 6/2011 | Macioszek et al. | 250/429 |

OTHER PUBLICATIONS

Nexus Biosystems Products—Sample Management, Storage, and Retieval; "Sample Storage Systems; Universal Store Systems"; downloaded on Jan. 24, 2011 at http://nexusbiosystems.com/pages/products/managementStorageRetrieval.html/.

* cited by examiner

*Primary Examiner* — Yolanda Cumbess
(74) *Attorney, Agent, or Firm* — Pioneer Hi-Bred International, Inc.

(57) ABSTRACT

A storage tray populator configured to populate a storage rack with a plurality of biological sample containers is provided. The storage tray populator may include a randomizer configured to receive the biological sample containers and randomly distribute the biological sample containers. Further, a transport apparatus may transport the biological sample containers from the randomizer to the storage rack. Additionally, a controller may control at least the transport apparatus. Thereby storage trays may be populated, and access to a desired biological sample may be improved. Methods for populating storage racks with a plurality of biological sample containers are also provided.

8 Claims, 11 Drawing Sheets

STORAGE TRAY POPULATOR AND METHOD FOR POPULATING A STORAGE TRAY WITH A PLURALITY OF BIOLOGICAL SAMPLE CONTAINERS

CROSS-REFERENCE TO RELATED APPLICATIONS

The present application claims priority from U.S. Provisional Application No. 61/483,284, filed May 6, 2011, which is hereby incorporated herein in its entirety by reference

FIELD OF THE INVENTION

Various embodiments of the present invention relate generally to systems and methods for populating storage trays. More specifically, embodiments of the present invention provide methods and systems for randomly populating storage trays with biological sample containers.

BACKGROUND OF THE INVENTION

The storage of biological samples used in research operations may present issues and challenges that may be uncommon to other storage scenarios. In this regard, the storage of Deoxyribonucleic Acid (DNA) primers and probes may involve carefully controlling the environmental conditions to which the primers and probes are exposed in order to preserve the samples. For example, the primers and probes may be stored in sealed tubes or other containers configured to prevent contamination. Further, the primers and probes may be frozen or otherwise cooled so to preserve the primers and probes. Accordingly, specialized freezers and/or other environmental control chambers may be employed in the storage of biological samples. For example, a product sold under the name of UNIVERSAL STORE by NEXUS BIOSYSTEMS may be employed to store the biological samples.

BRIEF SUMMARY

In one embodiment a storage tray populator configured to populate a storage tray with a plurality of biological sample containers is provided. The storage tray populator may comprise a randomizer configured to receive the biological sample containers and randomly distribute the biological sample containers, a transport apparatus configured to transport the biological sample containers from the randomizer to the storage tray, and a controller configured to control at least the transport apparatus. The storage tray populator may further comprise a sample orienting device configured to orient the biological sample containers such that a first end of each of the biological sample containers is directed into the transport apparatus.

The transport apparatus may comprise a sample depositor configured to receive the biological sample containers and deposit the biological sample containers in a plurality of sample holders defined by the storage tray. The sample depositor may be configured to hold the biological sample containers in a plurality of depositor slots. In some embodiments the sample holders defined by the storage tray may be positioned in a plurality of columns. The sample depositor may be configured to move along an axis to deposit the biological sample containers in one of the columns selected by the controller. One or more of the columns may be offset in a direction perpendicular to the axis. The sample depositor may be further configured to move in the direction to deposit the biological sample containers in the columns that are offset.

The transport apparatus may further comprise a sample accumulator configured to accumulate the biological sample containers in a plurality of accumulator slots and load each of the biological sample containers retained in the accumulator slots into the sample depositor. The sample accumulator may be configured to substantially simultaneously load each of the biological sample containers held in the accumulator slots into the sample depositor. The transport apparatus may further comprise a sample feeder configured to sequentially feed the biological sample containers to the sample accumulator. The sample feeder may comprise a sensor configured to detect presence of the biological sample containers at the sample feeder and the controller may be configured to maintain proximity of the sample feeder to one of the accumulator slots in the accumulator at least until one of the biological sample containers is detected by the sensor.

Further, the sample feeder may be configured to feed the biological sample containers to the sample accumulator while the sample depositor deposits the biological sample containers in the sample holders defined by the storage tray. The sample feeder may be configured to shift position relative to the accumulator slots of the sample accumulator in an instance in which the sample accumulator is full. The sample feeder may comprise a delivery tube configured to receive the biological sample containers from the randomizer. In some embodiments the sample feeder may be configured to shift position relative to the accumulator slots of the sample accumulator without moving the delivery tube.

In a further embodiment a method for populating a storage tray with a plurality of biological sample containers is provided. The method may include receiving the biological sample containers, randomly distributing the biological sample containers with a randomizer, transporting the biological sample containers from the randomizer to the storage tray with a transport apparatus, and automatically controlling at least the transport apparatus with a controller. The method may further include storing the storage tray in a freezer.

In some embodiments the method may further comprise orienting the biological sample containers such that a first end of each of the biological sample containers is directed into the transport apparatus. Further, transporting the biological sample containers with the transport apparatus may comprise depositing the biological sample containers in a plurality of sample holders defined by the storage tray with a sample depositor. The sample holders defined by the storage tray may be positioned in a plurality of columns and depositing the biological sample containers in the plurality of sample holders defined by the storage tray may comprise moving the sample depositor along an axis to deposit the biological sample containers in one of the columns selected by the controller. One or more of the columns of sample holders may be offset in a direction perpendicular to the axis and moving the sample depositor along the axis to deposit the biological sample containers in one of the columns may comprise moving the sample depositor in the direction to deposit the biological sample containers in the columns that are offset.

Additionally, transporting the biological sample containers with the transport apparatus may further comprise accumulating the biological sample containers in a plurality of accumulator slots defined in a sample accumulator and loading each of the biological sample containers retained in the accumulator slots into the sample depositor. Transporting the biological sample containers with the transport apparatus may further comprises sequentially feeding the biological sample containers to the sample accumulator with a sample feeder. Also, transporting the biological sample containers with the transport apparatus may further comprise detecting presence of one of the biological sample containers at the sample feeder and maintaining proximity of the sample feeder to one of the accumulator slots in the accumulator at least until a biological sample container is detected by the sensor.

Feeding the biological sample containers to the sample accumulator with the sample feeder may comprise feeding the biological sample containers to the sample accumulator while the sample depositor deposits the biological sample containers in the sample holders defined by the storage tray. The method may additionally comprise shifting position of the sample feeder relative to the accumulator slots of the sample accumulator in an instance in which the sample accumulator is full. Further, feeding the biological sample containers to the sample accumulator with the sample feeder may comprise feeding the biological sample containers to the sample accumulator through a delivery tube configured to receive the biological sample containers from the randomizer. The method may further comprise shifting position of the sample feeder relative to the accumulator slots of the sample accumulator without moving the delivery tube.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As noted above, specialized equipment such as freezers may be employed to control the conditions to which biological samples such as DNA primers and probes are exposed. In order to store the sealed tubes or other biological sample containers, the biological sample containers may be deposited in a plurality of sample holders defined by a storage tray. Thereby, the storage trays may be placed in a freezer or other environmental control chamber and the biological samples may be preserved. In order to maximize usage of the space within the environmental control chamber, the storage trays may be positioned in close proximity to one another.

While storing biological samples in this manner may make use of the storage space in the environmental control chamber relatively efficiently, access to the biological samples may be hampered. For example, in order to retrieve a desired biological sample, a storage tray containing the desired biological sample must be located. Further, loading the storage trays may require relatively large quantities of manual labor in order to populate the storage trays with the biological sample containers.

Figure 1:
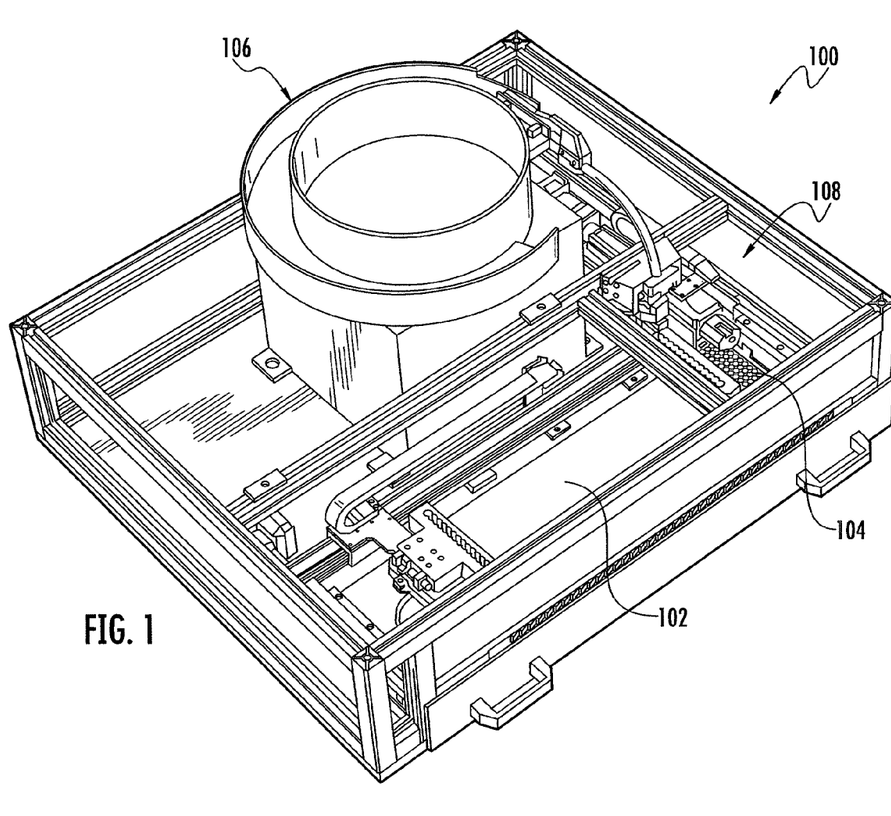
FIG. 1 illustrates a perspective view of a storage tray populator configured to populate a storage tray with a plurality of biological sample containers in accordance with an example embodiment of the present invention.

Accordingly, embodiments of storage tray populators configured to populate a storage tray with a plurality of biological sample containers are provided herein. FIG. 1 illustrates an example embodiment of a storage tray populator 100 configured to populate a storage tray 102 with a plurality of biological sample containers 104, such as sealed tubes. The storage tray populator 100 may include a randomizer 106 configured to receive the biological sample containers 104 and randomly distribute the biological sample containers. The storage tray populator 100 may further comprise a transport apparatus 108 configured to transport the biological sample containers 104 from the randomizer 106 to the storage tray 102. Additionally, a controller (not illustrated), such as a programmable logic controller comprising a processor and memory, may be configured to control at least the transport apparatus 108.

Figure 2:
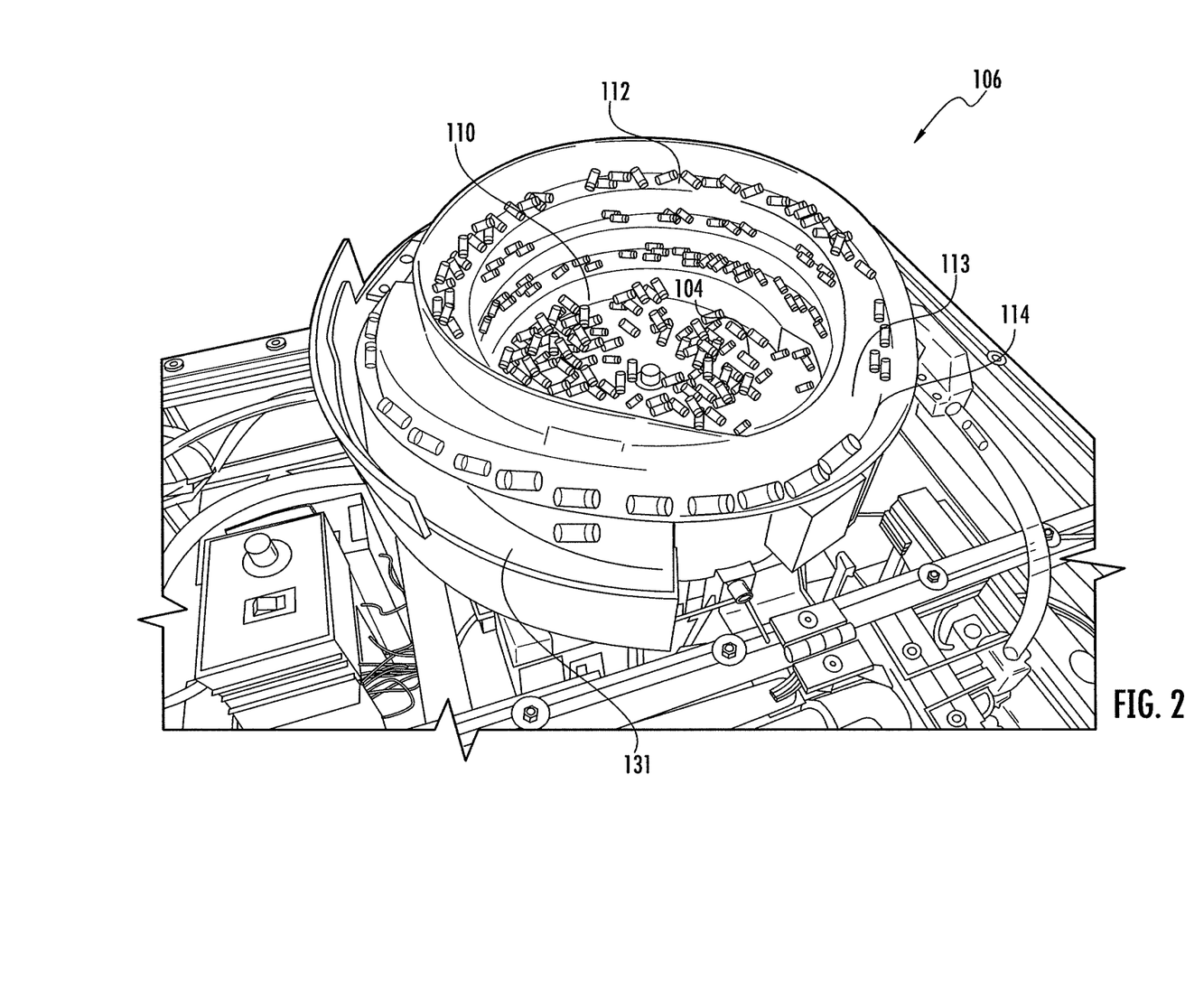
FIG. 2 illustrates an enlarged view of a randomizer of the storage tray populator of FIG. 1 in accordance with an example embodiment of the present invention.

FIG. 2 illustrates an enlarged view of the randomizer 106. As illustrated, in one embodiment the randomizer 106 may comprise a vibratory bowl feeder designed by WILKERSON AUTOMATION. In this regard, the randomizer 106 may define a bowl 110 configured to receive the biological sample containers 104. During operation the randomizer 106 may vibrate and hence cause the biological sample containers 104 to move in a random fashion within the bowl 110. Although the biological sample containers 104 may tend to mix as a result of the vibratory movement of the bowl 110, in some embodiments the randomizer 106 may further comprise an additional mixing or stirring device that mixes, stirs, or otherwise agitates the biological sample containers. Alternatively, the biological sample container 104 may be mixed by hand within the bowl 110.

In this regard, biological samples may tend to be produced or received in batches. Accordingly, without mixing the biological sample containers 104, each type of biological sample may tend to be clustered in groups within one or a relatively small number of storage trays 102 when placed in storage trays in the order in which biological samples are produced or received. Thus, applicants have determined that by mixing biological sample container 104 containing various different types of biological samples prior to depositing the biological sample containers in the storage trays 102, the biological sample containers may be randomly distributed such that they are deposited in the storage trays in a random order. Accordingly, by distributing the biological sample containers 104 for each type of biological sample amongst various ones of the storage trays 102, the odds of a desired biological sample being positioned in a given storage tray may be increased. Thereby, for example, a desired biological sample (contained in one of the biological sample containers 104) may be more easily accessed from a freezer or other environmental control chamber. Accordingly, the randomizer 106 may provide benefits in terms of efficiency when accessing the stored biological sample containers 104.

However, as noted above, the storage tray populator 100 may provide additional benefits in terms of efficiency in storing the biological sample containers 104 in storage trays 102. In this regard, the randomizer 106 may be configured to singulate the biological sample containers 104. In the illustrated embodiment the randomizer 106 may singulate the biological sample containers 104 by directing the biological sample containers along a sloping spiral track 112. In particular, the randomizer 106 may be configured to vibrate in a direction substantially parallel to the slope of the track 112. Accordingly, the vibration may direct the biological sample containers 104 upward and out of the bowl 110. Further, the track 112 may define a cambered surface 113 that slopes perpendicularly to the path defined by the track. Accordingly, as the biological sample containers 104 vibrate while moving along the track 112, the biological sample containers may tend to form a single file line as the force of gravity directs the biological sample containers to a lower edge 114 defined by the cambered surface 113.

Figure 3:
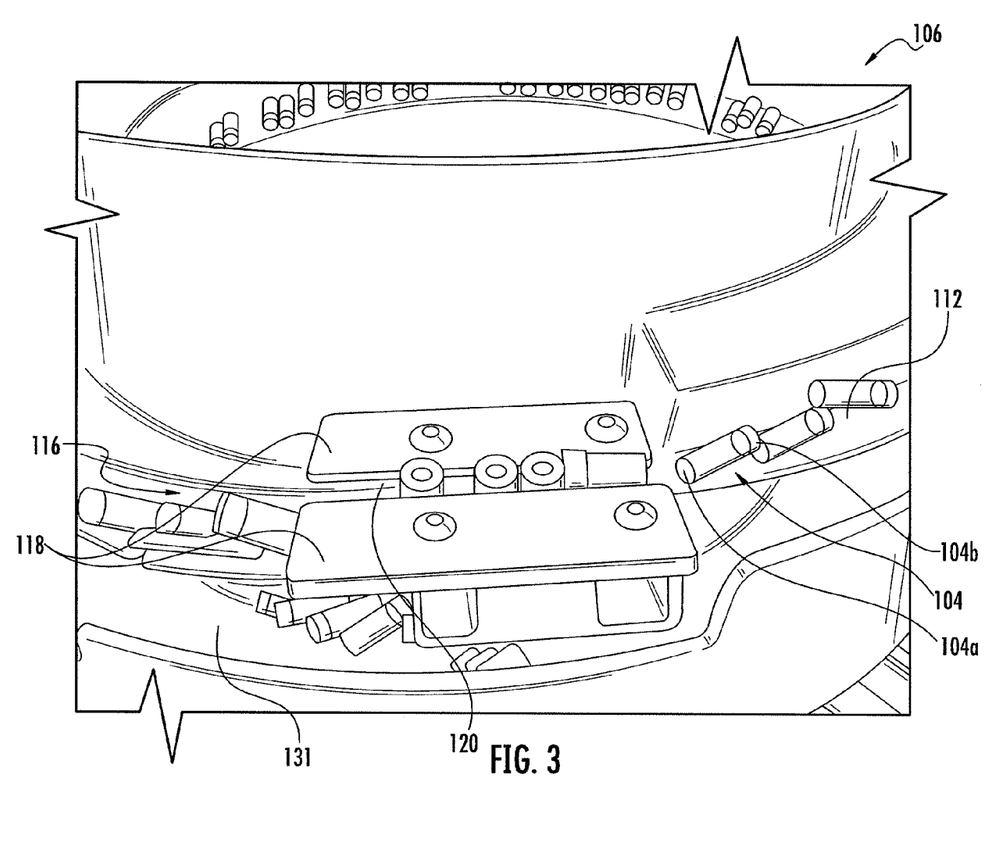
FIGS. 3-5 illustrate enlarged views of successive portions of a sample orienting device of the randomizer in accordance with an example embodiment of the present invention.
Figure 4:
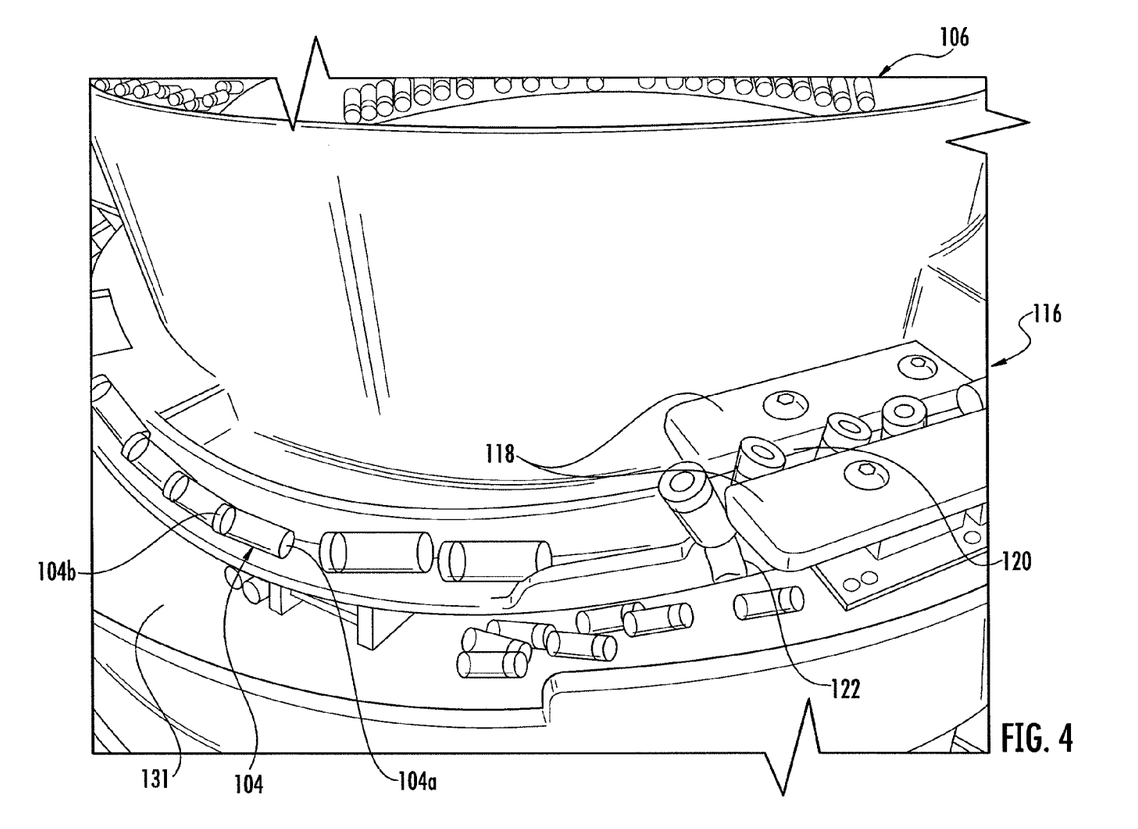
Figure 5:
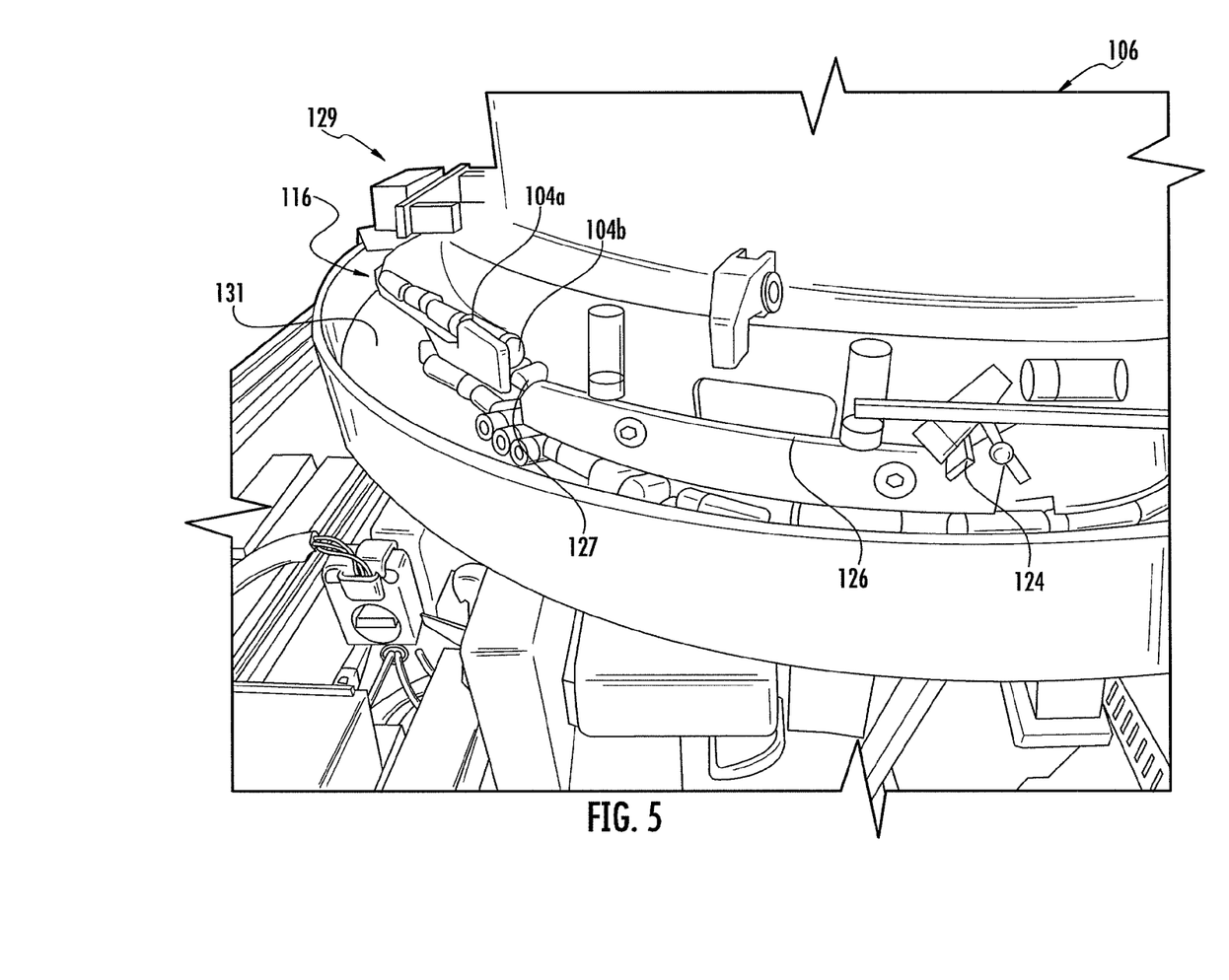

As illustrated in FIGS. 3-5, in some embodiments the randomizer 106 may further comprise a sample orienting device (generally referenced as "116") configured to orient the biological sample containers 104 such that a first end 104a of each of the biological sample containers is directed into the transport apparatus 108. Orientation of the biological sample containers 104 in this manner may assist in inserting the biological sample containers in the storage tray 102.

As illustrated in FIG. 3, the sample orienting device 116 may comprise a pair of parallel plates 118 that define a gap 120 therebetween. The parallel plates 118 may be positioned at a distance from one another such that the gap 120 is larger than the diameter of the first end 104a of the biological sample containers 104, but smaller than a diameter of a second end 104b of the biological sample containers. For example a cap at the second end 104b of the biological sample containers 104 may extend to a larger diameter than the first end 104a of the biological sample containers.

Thereby, as the biological sample containers 104 are directed from the track 114 between the parallel plates 118, the first end 104a of the biological sample containers may fall through the gap 120, whereas the second end 104b of the biological sample containers may catch on the two plates and hang therefrom. Each successive biological sample container 104 may fall through the gap 120 such that the second end 104b of each biological sample container catches on the parallel plates 118 in this same manner with vibration continuing to move the biological sample containers through the sample orienting device 116.

Thereby, as illustrated in FIG. 4, the biological sample containers 104 may travel through the gap 120 along the length of the parallel plates 118. At the end of the parallel plates 118, the first end 104a of each biological sample container 104 may contact a protrusion 122, which may comprise a weld bead. Thereby, each biological sample container 104 may trip over the protrusion 122 and thus land such that the second end 104b of the biological sample container is oriented in front of the first end 104a of the biological sample container in terms of the overall direction of movement of the biological sample containers.

Further, as illustrated in FIG. 5, the biological sample containers 104 may be directed down a ramp 124 such that the second end 104b of each biological sample container lands downwardly on a ledge 126. The biological sample containers 104 continue along the ledge 126 until they contact a second protrusion 127, which may comprise a weld bead in some embodiments, and thereby the biological sample containers are tripped again. Thereby, the biological sample containers 104 may fall over such that the first end 104a is now oriented in front of the second end 104b of the biological sample container in terms of the overall direction of movement of the biological sample containers. Accordingly, the sample orienting device 116 may orient each biological sample container 104 such that the first end 104a is directed into the transport apparatus 108. In particular, the sample containers 104 may be directed to a sample feeder 129 that comprises a portion of the transport apparatus 108.

During the singulation and orientation process, some of the biological sample containers 104 may fall from the track 112 or the ledge 126 such that the biological sample containers return to the bowl 110 and intermix with the biological sample containers therein. For example, biological sample containers 104 falling from the ledge 112 may fall onto a shelf 131 that catches the biological sample containers and directs the biological sample containers back into the bowl 110. In some embodiments approximately ninety percent of the biological sample containers 104 may fall from the track 112 or ledge 126 back into the bowl 110 during each trip out of the bowl. Thereby, the biological sample containers 104 may be randomly distributed by this additional intermixing caused by the randomizer 106. Note, however, that although one particular embodiment of the randomizer 106 is illustrated, various other embodiments of methods and apparatuses configured to randomly distribute, singulate, and/or orient the biological sample containers 104 may be employed in other embodiments.

Figure 6:
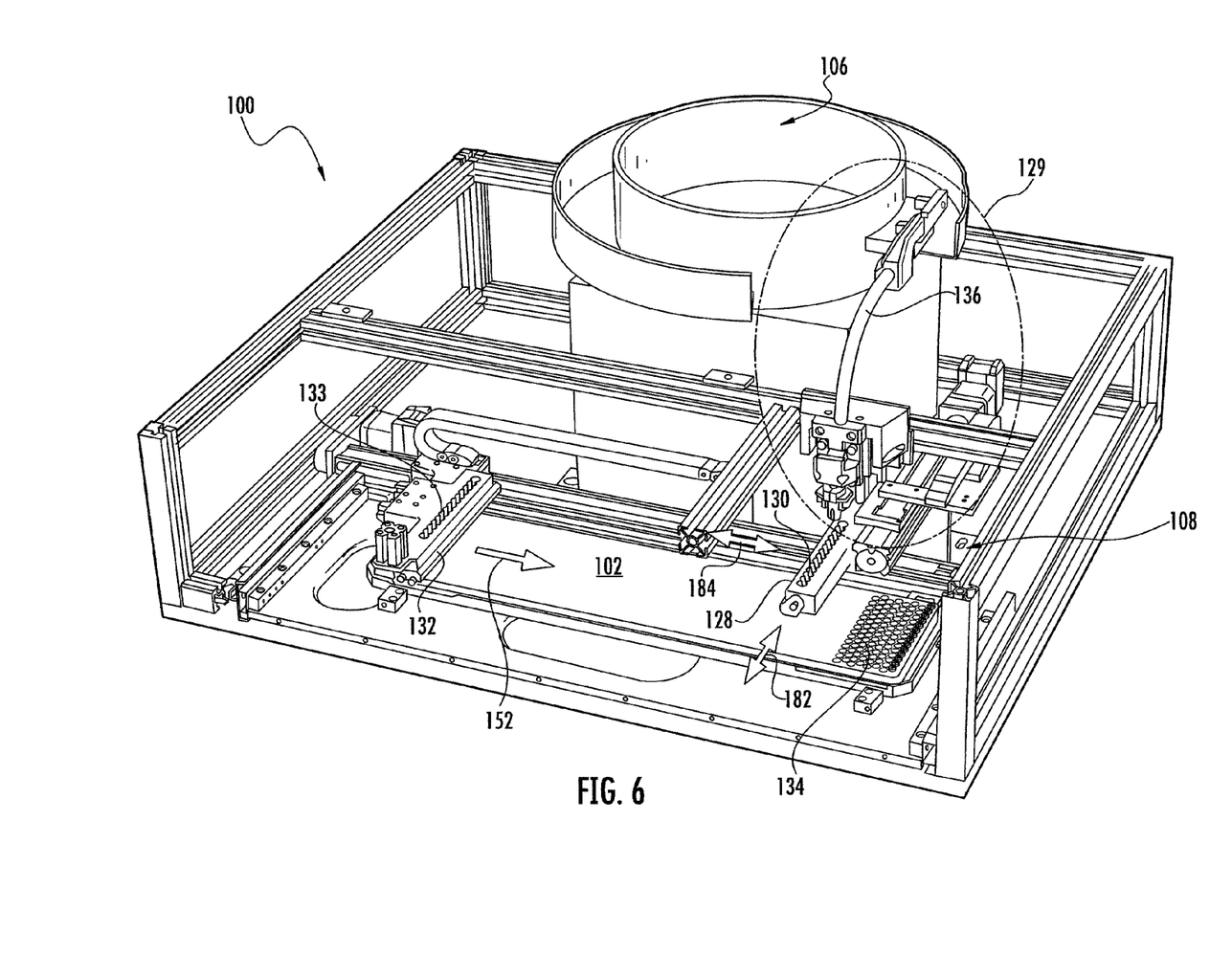
FIG. 6 illustrates a perspective view of the storage tray populator of FIG. 1 with a front panel removed for clarity purposes in accordance with an example embodiment of the present invention.

As illustrated in FIG. 6, the sample feeder 129 may be configured to sequentially feed the biological sample containers 104 to a sample accumulator 128, which may comprise an additional portion of the transport apparatus 108. As will be discussed in detail below, the sample accumulator 128 may be configured to accumulate the biological sample containers 104 in a plurality of accumulator slots 130. Thereby, the sample accumulator 128 may load each of the biological sample containers 104 retained in the accumulator slots 130 into a sample depositor 132. The sample depositor 132 may thus receive the biological sample containers 104 in a plurality of depositor slots 133 and deposit the biological sample containers in a plurality of sample holders 134 defined by the storage tray 102.

Figure 7:
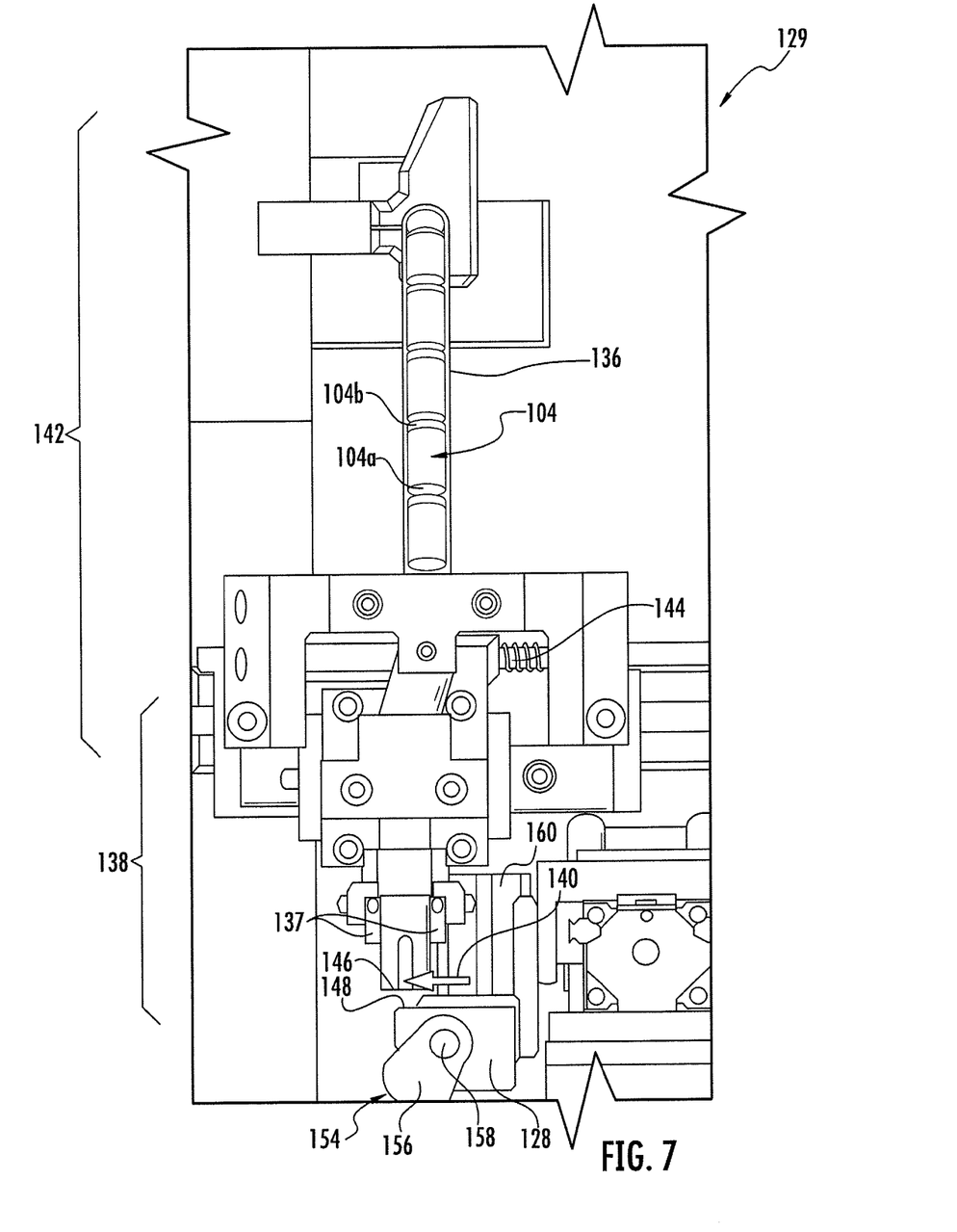
FIG. 7 illustrates an enlarged front view of a sample feeder and a sample accumulator of the storage tray populator of FIG. 1 in accordance with an example embodiment of the invention.

Returning to the sample feeder 129, as illustrated in FIG. 7, in one embodiment the sample feeder 129 may comprise a delivery tube 136 configured to receive the biological sample containers 104 from the randomizer 106. In particular, the biological sample containers 104 may be received from the orienting device 116 such that the first ends 104a of the sample containers are in front of the second ends 104b of the biological sample containers. Thereby the delivery tube 136 may direct the first ends 104a of the biological sample container 104 into the accumulator slots 130 in the sample accumulator 128.

The sample accumulator 128 and the sample feeder 129 may be configured to move relative to one another such that the sample feeder may direct one of the biological sample containers 104 to each of the accumulator slots 130 in the sample accumulator. In the illustrated embodiment, the sample accumulator 128 is configured to move in a direction into and out of the page in terms of the orientation illustrated in FIG. 7. In order to ensure that a biological sample container 104 is received in each accumulator slot 130, the sample feeder 129 may comprise a sensor 137 configured to detect presence of the biological sample containers at the sample feeder.

In one embodiment the sensor 137 may comprise a proximity sensor, for example an optical proximity sensor, although various other sensors configured to detect the presence and/or absence of the biological sample containers 104 may be employed in other embodiments. In the illustrated embodiment, one side of the sensor 137 may comprise a transmitter configured to emit light, and the other side of the sensor may comprise a receiver configured to detect reception or absence of the light to thereby detect presence and/or absence of the biological sample containers 104. In one embodiment, the cap at the second end 104b of the biological sample containers 104 may be opaque or otherwise block, refract, or reflect the beam of light such that reception of the beam of light by the receiver portion of the sensor 137 is temporarily interrupted. The controller may be configured to maintain proximity of the sample feeder 129 to one of the accumulator slots 130 in the sample accumulator 128 at least until one of the biological sample containers 104 is detected by the sensor 137. Accordingly, the sample accumulator 128 may maintain its position until a biological sample container 104 is received in one of the accumulator slots 130, and then shift position to allow another accumulator slot to be filled.

In some embodiments the sample feeder 129 may be configured to shift position relative to the accumulator slots 130 of the sample accumulator 128 in an instance in which the sample accumulator is full. For example, a displaceable portion 138 of the sample feeder 129 may move in a direction indicated by an arrow 140 relative to a stationary portion 142 of the sample feeder. Displacement may occur as a result of an air cylinder, solenoid, or other actuator acting on the displaceable portion 138. For example, when the sample feeder 129 is directing biological sample containers 104 into the accumulator slots 130, an actuator may displace the displaceable portion 138 generally to the right in terms of the orientation illustrated in FIG. 7. Thereafter, a spring 144 may displace the displaceable portion 138 in the direction indicated by the arrow 140 back to a starting position when the actuator releases the displaceable portion.

By displacing the displaceable portion 138 of the sample feeder 129 as indicated by the arrow 140, the sample feeder may be moved from a first position wherein the sample feeder is configured to deposit the biological sample containers 104 in the accumulator slots 130 defined by the sample accumulator 128 to a second position wherein an end 146 of the sample feeder is positioned proximate a top surface 148 of the sample accumulator. The top surface 148 may thereby contact the next biological sample container 104 directed through the sample feeder 129 after the accumulator slots 130 of the sample accumulator 128 are filled. Thus, one or more of the biological sample containers 104 may be temporarily retained in the sample feeder 129 by the top surface 148 of the sample accumulator 128 until the sample accumulator loads the biological sample containers into the sample depositor 132.

Accordingly, in some embodiments the displaceable portion 138 of the sample feeder 129 may be configured to shift position relative to the accumulator slots 130 of the sample accumulator 128 without moving the delivery tube 136. Thus, by maintaining the delivery tube 136 in a substantially stationary position, the biological sample container 104 may be delivered to the accumulator slots 130 without concern for kinks in the delivery tube causing biological sample containers to bind therein. However, in an alternate embodiment the sample feeder 129 may shift position of the delivery tube 136 in the direction indicated by the arrow 140 or another direction such that the end of the delivery tube is displaced from the accumulator slots 130 and proximate a surface that holds the biological sample containers 104 in the delivery tube. Further, various other embodiments of structures and methods may be employed to selectively control feeding of the biological sample containers 104 to the sample accumulator 128 as may be understood by one having skill in the art.

As noted above, the sample accumulator 128 may be configured to load each of the biological sample containers 104 retained in the accumulator slots 130 into the depositor slots 133 defined by the sample depositor 132. In this regard, in embodiments in which the sample accumulator 128 moves relative to the sample feeder 129 in order to receive the biological sample containers 104 in each of the accumulator slots 130, the sample accumulator may move to a loading position after the accumulator slots are filled. In the loading position the accumulator slots 130 may be configured to align with the depositor slots 133 defined by the sample depositor 132.

For example, the sample depositor 132 may move (e.g. in the direction indicated by the arrow 152 in FIG. 6) to a position wherein the sample depositor is beneath the sample accumulator 128. Further, the sample accumulator 128 may move in a direction (e.g. into or out of the page, in terms of the orientation illustrated in FIG. 7) such that each of the accumulator slots 130 aligns with a respective one of the depositor slots 133 in the sample depositor 132. Thereby, the controller may direct the sample accumulator 128 to load the biological sample containers 104 into the depositor slots 133 in the sample depositor 132.

For example, in the illustrated embodiment the sample accumulator 128 includes a transfer apparatus 154 including a door 156 that is moveable between a first position (illustrated in FIG. 7) wherein the door is closed such that it supports the biological sample containers 104 in the accumulator slots 130 and a second position wherein the door is open and allows the biological sample containers to fall from the accumulator slots. In particular, in the illustrated embodiment the door 156 is configured to rotate about a pivot point 158 as a result of an actuator 160 imparting force on the door.

Figure 8:
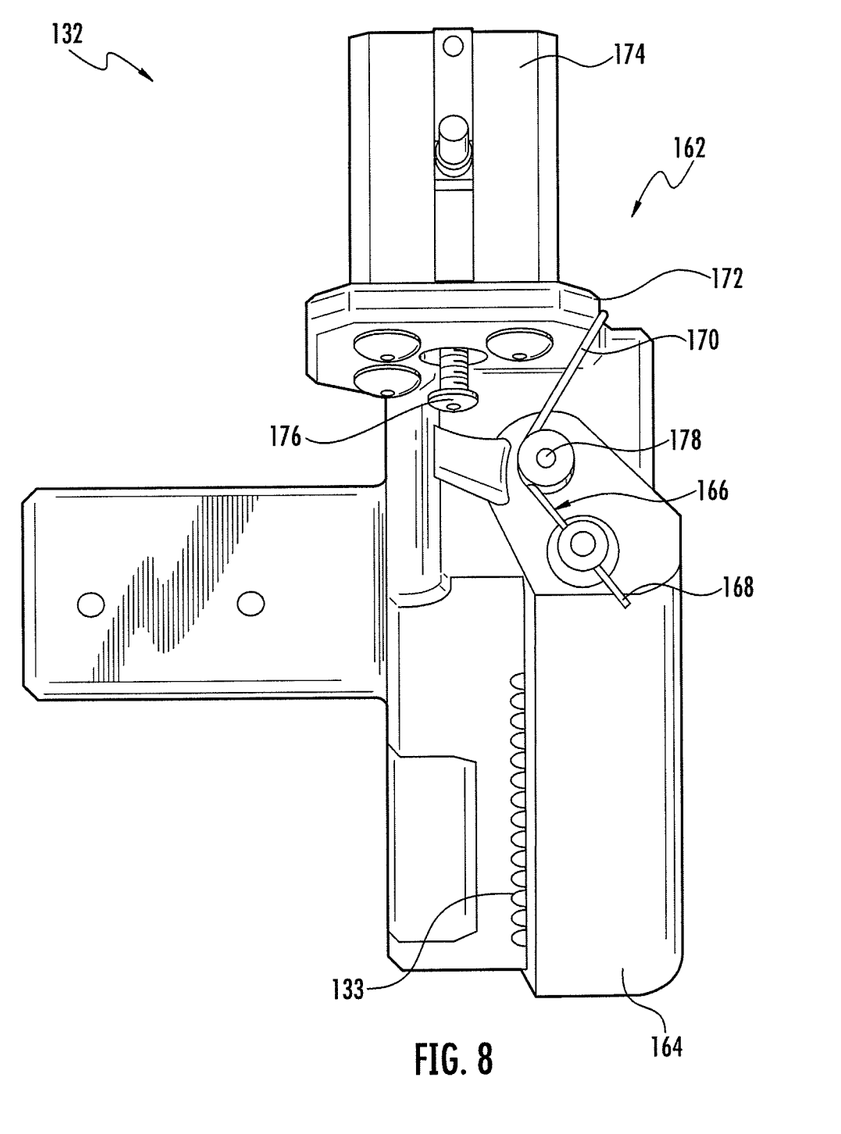
FIG. 8 illustrates an enlarged perspective view of a sample depositor with a transfer apparatus in a first (e.g., closed) position in accordance with an example embodiment of the invention.
Figure 9:
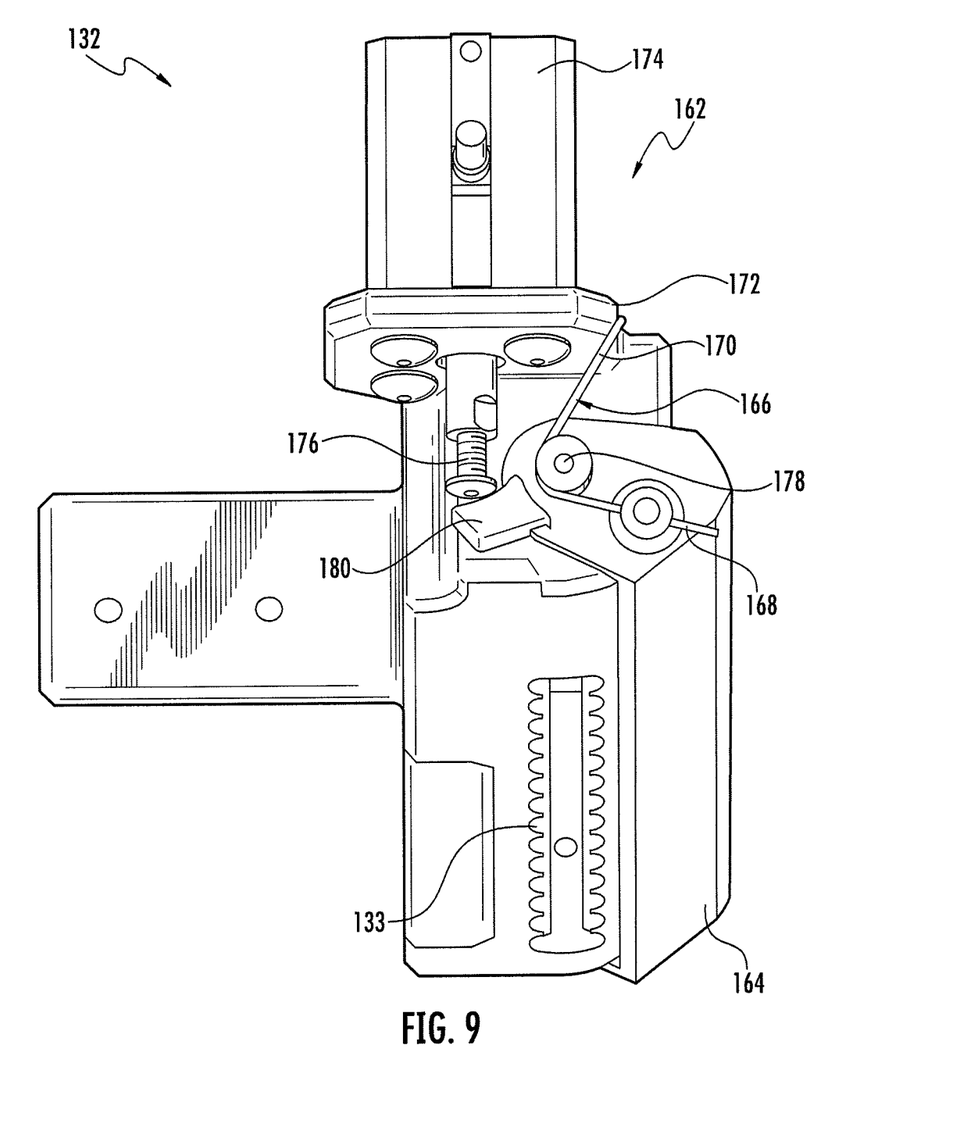
FIG. 9 illustrates the sample depositor of FIG. 8 with the transfer apparatus in an second (e.g. open) position in accordance with an example embodiment of the invention.

As illustrated in FIGS. 8 and 9, the sample depositor 132 may also include a transfer apparatus 162, and the transfer apparatus of the sample depositor may be substantially similar to the transfer apparatus 154 of the sample accumulator 128 in some embodiments. Accordingly, for purposes of brevity, the transfer apparatus 162 of the sample depositor 132 will be discussed, but the description may also generally apply to the sample accumulator 128. In this regard, FIG. 8 illustrates the sample depositor 132 when a moveable door 164 of the transfer apparatus 162 is in a first position wherein the door is closed such that it at least partially extends underneath the depositor slots 133 defined by the sample depositor. In this configuration the sample depositor 132 may receive and support the biological sample containers 104 in the sample depositor slots 133 with the door 164 positioned so as to prevent the biological sample containers from falling therethrough. In the illustrated embodiment the door 164 is biased to this position by a torsion spring 166. A first leg 168 of the spring 166 couples to the door 164. A second leg 170 of the spring 166 contacts a stop member 172 defined by the body of the sample depositor 132. Thereby, the spring 166 may bias the door 164 such that the door at least partially blocks the depositor slots 133.

The transfer apparatus 162 may further include an actuator 174. In one embodiment the actuator may comprise an air cylinder that is actuated via application of compressed air. The actuator 174 may comprise a displaceable piston 176. In the first position (i.e. the closed position), the displaceable piston 176 may not contact the door 164, or contact with the door may be limited such that the door at least partially blocks the depositor slots 148.

However, as illustrated in FIG. 9, when the actuator 174 extends the piston 176, the piston may contact the door 164 so as to rotate the door about a pivot point 178. In particular, the piston 176 may contact a tab 180 defined by the door 164 so as to rotate the door. Accordingly, the door 164 may move to a second position wherein the biological sample containers 104 are no longer supported and hence the biological sample containers may fall out of the depositor slots 133 and into the sample holders 134 defined by the storage tray 102.

Figure 10:
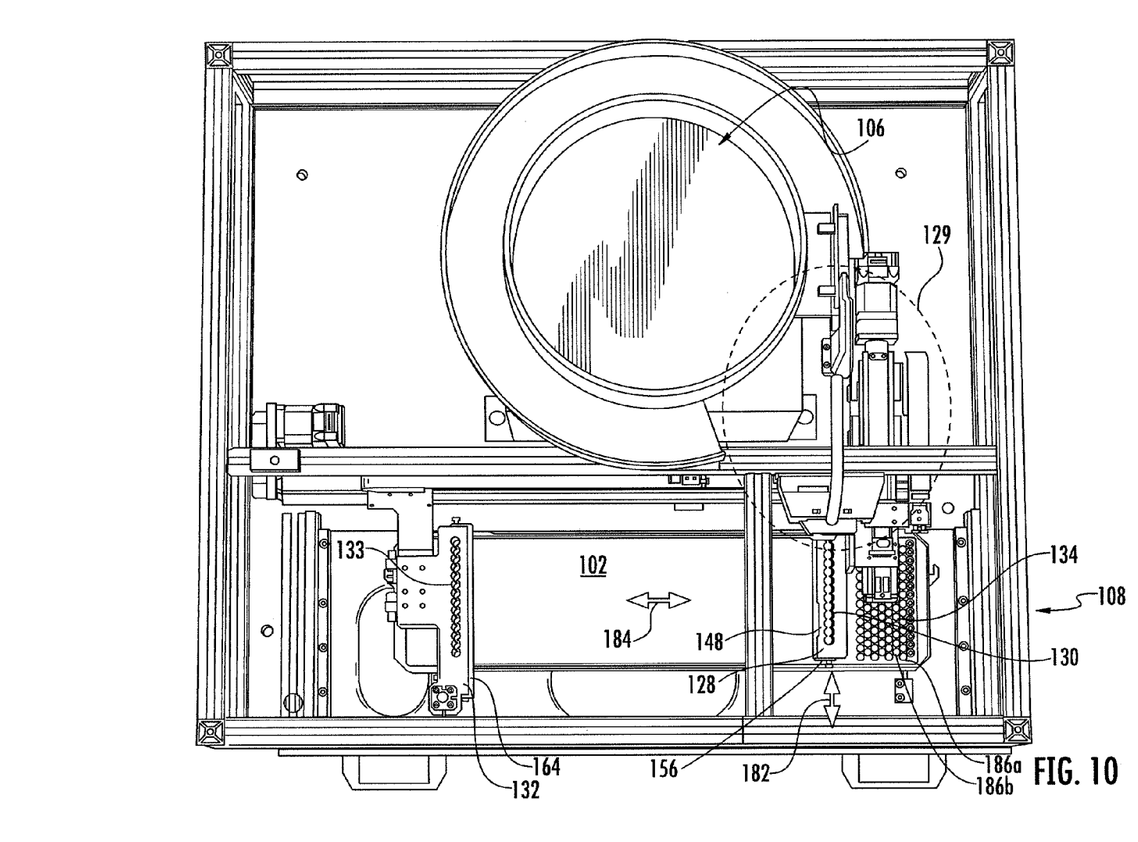
FIG. 10 illustrates a top view of the storage tray populator of FIG. 1 in accordance with an example embodiment of the invention.

With reference to FIG. 10, the overall operation of transport apparatus 108 will be briefly described. In this regard, biological sample containers 104 may be received by the sample feeder 129 from the randomizer 106 and directed into the accumulator slots 130 defined by the sample accumulator 128. In particular, the sample accumulator 128 may move along an axis 182 such that the sample feeder 129 directs one of the biological sample containers 104 into each of the accumulator slots 130. After each of the accumulator slots 130 is filled, the sample accumulator 128 may shift generally to the left (in terms of the illustrated orientation) along an axis 184 such that the next biological sample container 104 directed through the sample feeder 129 is stopped from exiting the sample feeder by the top surface 148 defined by the sample accumulator.

The sample depositor 132 may then move along the axis 184 such that the sample depositor is positioned underneath the sample accumulator 128 with the depositor slots 133 aligned with the accumulator slots 130. At this point, the transfer apparatus 154 of the sample accumulator 128 and the transfer apparatus 162 of the sample depositor 132 are both in the first (i.e. closed) configuration. Thereby, when the door 156 of the transfer apparatus 154 of the sample accumulator 128 releases the biological sample containers 104, the biological sample containers are loaded into the depositor slots 133 in the sample depositor 132. Thus, the sample accumulator 128 may be configured to substantially simultaneously load each of the biological sample containers 104 held in the accumulator slots 130 into the sample depositor 132.

The sample holders 134 defined by the storage tray 102 may be positioned in a plurality of columns 186. Thus, the sample depositor 132 may be configured to move along an axis (e.g. axis 184) to deposit the biological sample containers 104 in one of the columns selected by the controller. For example, the controller may be configured to direct the transfer apparatus 108 to sequentially fill each of the columns 186 in the storage tray 102.

Further, in some embodiments one or more of the columns 186 may be offset in a direction perpendicular to the axis 184. Accordingly, the sample depositor 132 may be further configured to move in the direction perpendicular to the axis 184 to deposit the biological sample containers 104 in the columns 186 that are offset. For example, the storage tray 102 may include a first column 186a that is offset in the direction perpendicular to the axis 184 relative to a second column 186b. This pattern may repeat in some embodiments such that every column 186 in the storage tray is offset from an adjacent column. Accordingly, when depositing the biological sample containers 104, the sample depositor 132 may move in a direction perpendicular to the axis 184 as necessary to deposit the biological sample containers in the sample holders 134.

In some embodiments the sample feeder 129 may be configured to feed the biological sample containers 104 to the sample accumulator 128 while the sample depositor 132 deposits the biological sample containers in the sample holders 134 defined by the storage tray 102. Thereby, the biological sample containers 104 may accumulate in the sample accumulator 128 while other biological sample containers are being deposited in the storage tray 102 by the sample depositor 132. Accordingly, when the sample depositor 132 returns to the position beneath the sample accumulator 128, the sample accumulator may be filled (or partially filled) with the biological sample containers 104 such that the biological sample containers may then be loaded into the sample depositor in a more rapid manner.

Accordingly, the transfer apparatus 108 may repeat the above-described process until each of the columns 186 of sample holders 134 are full of the biological sample containers 104. Thereafter the storage tray 102 may be moved to freezer or other environmental control chamber for storage and/or preservation of the biological samples. Accordingly, storage trays 102 may be filled in an automated and relatively rapid manner. Further, as noted above, due to the random distribution of the biological sample containers 104 by the randomizer 106, access to desired biological samples may be facilitated. In particular, access may be facilitated because the random distribution of the biological samples amongst the storage trays 102 may increase the odds of a desired biological sample being positioned in each storage tray. Accordingly, fewer storage trays 102 may need to be moved to access the necessary storage tray to retrieve the desired biological sample. In contrast, without the randomization discussed herein, the biological sample containers 104 may tend to be deposited in the storage trays 102 in the order in which they are received. Accordingly, biological samples of the same type may otherwise end up clustered together in a relatively small number of storage trays 102, and hence access to a desired biological sample may require retrieving one of the relatively small number of storage trays, which may be more difficult.

Embodiments of methods for populating a storage tray with a plurality of biological sample containers are also provided. The methods may employ the above-described storage tray populator 100 in some embodiments. In one example embodiment all or a portion of the operations of the methods may be controlled by the above-described controller. For example, the operations of the method may be embodied as computer program code stored in the memory of the controller and executed by the processor of the controller.

Figure 11:
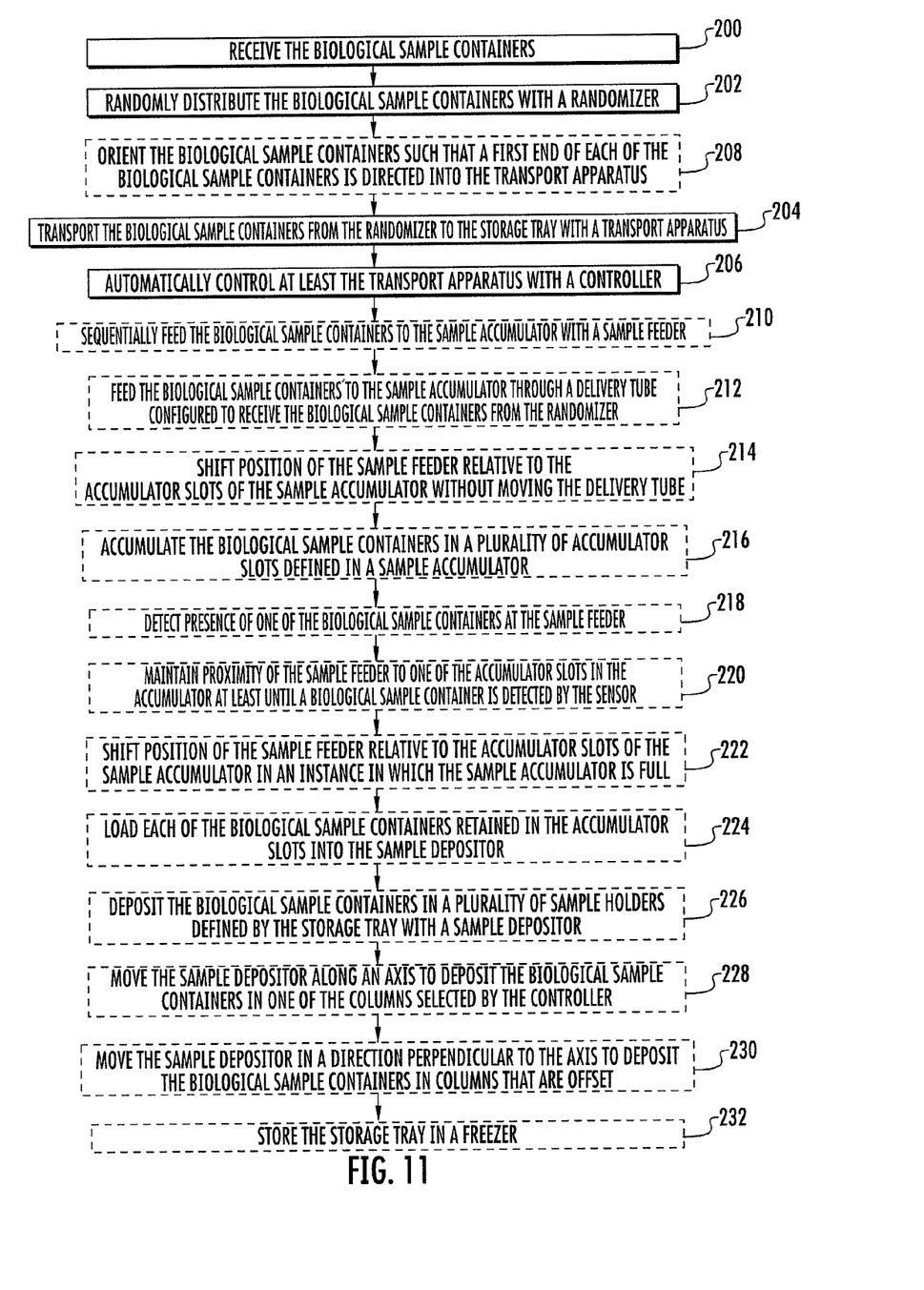
FIG. 11 illustrates a method for populating a storage tray with a plurality of biological sample containers in accordance with an example embodiment of the present invention.

As illustrated in FIG. 11, in one embodiment a method for populating a storage tray with a plurality of biological sample containers may comprise receiving the biological sample containers at operation 200. Further, the method may include randomly distributing the biological sample containers with a randomizer at operation 202. Additionally, the method may include transporting the biological sample containers from the randomizer to the storage tray with a transport apparatus at operation 204. Also, the method may comprise automatically controlling at least the transport apparatus with a controller at operation 206.

In some embodiments the method may additionally or alternatively comprise other operations including those operations illustrated in dashed lines in FIG. 11. For example, the method may include orienting the biological sample containers such that a first end of each of the biological sample containers is directed into the transport apparatus at operation 208. Further, the operation 204 of transporting the biological sample containers with the transport apparatus may include sequentially feeding the biological sample containers to the sample accumulator with a sample feeder at operation 210. Also, the operation 210 of feeding the biological sample containers to the sample accumulator with the sample feeder may comprise feeding the biological sample containers to the sample accumulator through a delivery tube configured to receive the biological sample containers from the randomizer at operation 212. Additionally, the method may include shifting position of the sample feeder relative to the accumulator slots of the sample accumulator without moving the delivery tube at operation 214.

Further, transporting the biological sample containers with the transport apparatus at operation 204 may comprise accumulating the biological sample containers in a plurality of accumulator slots defined in a sample accumulator at operation 216. Also, transporting the biological sample containers with the transport apparatus at operation 204 may comprise detecting presence of one of the biological sample containers at the sample feeder at operation 218 and maintaining proximity of the sample feeder to one of the accumulator slots in the accumulator at least until a biological sample container is detected by the sensor at operation 220. Additionally, the method may include shifting position of the sample feeder relative to the accumulator slots of the sample accumulator in an instance in which the sample accumulator is full at operation 222.

Also, the method may comprise loading each of the biological sample containers retained in the accumulator slots into the sample depositor at operation 224. Thus, transporting the biological sample containers with the transport apparatus at operation 204 may comprise depositing the biological sample containers in a plurality of sample holders defined by the storage tray with a sample depositor at operation 226. In some embodiments feeding the biological sample containers to the sample accumulator with the sample feeder at operation 212 may comprise feeding the biological sample containers to the sample accumulator while the sample depositor deposits the biological sample containers in the sample holders defined by the storage tray at operation 226.

Further, in some embodiments the sample holders defined by the storage tray may be positioned in a plurality of columns. Accordingly, depositing the biological sample containers in the plurality of sample holders defined by the storage tray with a sample depositor at operation 226 may include moving the sample depositor along an axis to deposit the biological sample containers in one of the columns selected by the controller at operation 228. Additionally, one or more of the columns of sample holders may be offset in a direction perpendicular to the axis. Accordingly, moving the sample depositor along an axis to deposit the biological sample containers in one of the columns selected by the controller at operation 228 may comprise moving the sample depositor in a direction perpendicular to the axis to deposit the biological sample containers in columns that are offset at operation 230. Also, the method may comprise storing the storage tray in a freezer at operation 232.

Many modifications and other embodiments of the invention set forth herein will come to mind to one skilled in the art to which these invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A storage tray populator configured to populate a storage tray with a plurality of biological sample containers, comprising: a randomizer configured to receive the biological sample containers and randomly distribute the biological sample containers; a transport apparatus configured to transport the biological sample containers from the randomizer to the storage tray; and a controller configured to control at least the transport apparatus, wherein the transport apparatus comprises a sample depositor configured to receive the biological sample containers and deposit the biological sample containers in a plurality of sample holders defined by the storage tray, a sample accumulator configured to accumulate the biological sample containers in a plurality of accumulator slots and load each of the biological sample containers retained in the accumulator slots into the sample depositor, and a sample feeder configured to sequentially feed the biological sample containers to the sample accumulator, wherein the sample feeder comprises a sensor configured to detect presence of the biological sample containers at the sample feeder, and wherein the controller is configured to maintain proximity of the sample feeder to one of the accumulator slots in the accumulator at least until one of the biological sample containers is detected by the sensor.

2. A storage tray populator configured to populate a storage tray with a plurality of biological sample containers, comprising: a randomizer configured to receive the biological sample containers and randomly distribute the biological sample containers; a transport apparatus configured to transport the biological sample containers from the randomizer to the storage tray; and a controller configured to control at least the transport apparatus, wherein the transport apparatus comprises a sample depositor configured to receive the biological sample containers and deposit the biological sample containers in a plurality of sample holders defined by the storage tray, a sample accumulator configured to accumulate the biological sample containers in a plurality of accumulator slots and load each of the biological sample containers retained in the accumulator slots into the sample depositor, and a sample feeder configured to sequentially feed the biological sample containers to the sample accumulator, and wherein the sample feeder is configured to feed the biological sample containers to the sample accumulator while the sample depositor deposits the biological sample containers in the sample holders defined by the storage tray.

3. A storage tray populator configured to populate a storage tray with a plurality of biological sample containers, comprising: a randomizer configured to receive the biological sample containers and randomly distribute the biological sample containers; a transport apparatus configured to transport the biological sample containers from the randomizer to the storage tray; and a controller configured to control at least the transport apparatus, wherein the transport apparatus comprises a sample depositor configured to receive the biological sample containers and deposit the biological sample containers in a plurality of sample holders defined by the storage tray, a sample accumulator configured to accumulate the biological sample containers in a plurality of accumulator slots and load each of the biological sample containers retained in the accumulator slots into the sample depositor, and a sample feeder configured to sequentially feed the biological sample containers to the sample accumulator, and wherein the sample feeder is configured to shift position relative to the accumulator slots of the sample accumulator in an instance in which the sample accumulator is full.

4. The storage tray populator of claim 3, wherein the sample feeder comprises a delivery tube configured to receive the biological sample containers from the randomizer, and wherein the sample feeder is configured to shift position relative to the accumulator slots of the sample accumulator without moving the delivery tube.

5. A method for populating a storage tray with a plurality of biological sample containers, comprising: receiving the biological sample containers; randomly distributing the biological sample containers with a randomizer; transporting the biological sample containers from the randomizer to the storage tray with a transport apparatus; and automatically controlling at least the transport apparatus with a controller, wherein transporting the biological sample containers with the transport apparatus comprises depositing the biological sample containers in a plurality of sample holders defined by the storage tray with a sample depositor, accumulating the biological sample containers in a plurality of accumulator slots defined in a sample accumulator, loading each of the biological sample containers retained in the accumulator slots into the sample depositor, sequentially feeding the biological sample containers to the sample accumulator with a sample feeder, and detecting presence of one of the biological sample containers at the sample feeder, and maintaining proximity of the sample feeder to one of the accumulator slots in the accumulator at least until a biological sample container is detected by the sensor.

6. The method of claim 5, wherein feeding the biological sample containers to the sample accumulator with the sample feeder comprises feeding the biological sample containers to the sample accumulator while the sample depositor deposits the biological sample containers in the sample holders defined by the storage tray.

7. The method of claim 5, further comprising shifting position of the sample feeder relative to the accumulator slots of the sample accumulator in an instance in which the sample accumulator is full.

8. The method of claim 7, wherein feeding the biological sample containers to the sample accumulator with the sample feeder comprises feeding the biological sample containers to the sample accumulator through a delivery tube configured to receive the biological sample containers from the randomizer, and further comprising shifting position of the sample feeder relative to the accumulator slots of the sample accumulator without moving the delivery tube.

* * * * *